Aug. 15, 1933.  E. E. MURPHY  1,922,137
SOLE MOLDING MACHINE
Filed Dec. 5, 1929  3 Sheets-Sheet 1

Aug. 15, 1933.   E. E. MURPHY   1,922,137
SOLE MOLDING MACHINE
Filed Dec. 5, 1929   3 Sheets-Sheet 2

INVENTOR
Everett E. Murphy
By his Attorney
Nelson W. Howard

Aug. 15, 1933.  E. E. MURPHY  1,922,137
SOLE MOLDING MACHINE
Filed Dec. 5, 1929  3 Sheets-Sheet 3

Fig. 4.

Patented Aug. 15, 1933

1,922,137

UNITED STATES PATENT OFFICE 1,922,137

SOLE MOLDING MACHINE

Everett E. Murphy, Newburyport, Mass., assignor to United Shoe Machinery Corporation, Paterson, N. J., a Corporation of New Jersey Application December 5, 1929. Serial No. 411,832

56 Claims. (Cl. 12—22)

This invention relates to machines for molding soles, and in some of its aspects more particularly to machines for bending or molding the margins of turn shoe soles to facilitate the lasting and upper-sewing operations. The invention is herein illustrated as embodied in a machine for molding the margins of the toe portions of soles after the soles have been mounted on lasts, but it is to be understood that in its more general aspects the invention is not limited to an organization of that particular character.

In the manufacture of turn shoes it is the usual practice to mold or bend the margin of the sole, at least at the forepart, before the lasting operation, mainly by use of a machine of the progressive type which operates on different portions of the margin successively, as disclosed in Letters Patent No. 1,110,637, granted on September 15, 1914 upon an application of William C. Meyer. Since, however, it is difficult with a machine of that type to mold satisfactorily the extreme toe end of the sole, especially if the sole has a comparatively narrow or pointed toe, there is frequently used for shaping or molding this portion of the margin of the sole a machine of a different type which molds the margin about the toe at a single operation, as disclosed in Letters Patent No. 1,534,052, granted on April 21, 1925 upon an application of F. E. Beckman. Both those machines are so designed as to operate on the sole before it is mounted on a last, although it has been proposed to mold the margin of the sole on the last, as disclosed in still other Letters Patent, No. 1,639,720, granted on Aug. 23, 1927 upon an application of M. F. Brogan.

It is an object of this invention to provide improved means for molding the margins of soles in a machine of that type in which the molding is effected at a single operation, as distinguished from machines of the progressive type which mold different portions successively. It is a more particular object to provide, in such a machine, molding means readily conformable to soles of different sizes or shapes, so as to avoid the necessity for the use of different molds for the different soles. For the purpose in view the construction herein shown comprises a series of molding members interconnected in a chain-like structure to serve as a flexible mold which is readily conformable to the edge contour of each sole in response to pressure of the sole against it. The invention further provides means for controlling the flexible mold in such manner as to facilitate its conformity to the edges of soles of different sizes or shapes, with provision for adjustments for better accommodation to wide variations in size or shape. As illustrated the machine is especially adapted for molding soles on the lasts, although the invention is not thus limited in its applicability.

In accordance with a further feature the invention provides novel means for rendering the mold effective to perform the molding operation, the construction shown comprising means for moving a last and sole relatively to the mold to cause the mold to bend the margin of the sole toward the upper-shaping surface of the last. Still other novel features are to be recognized in means provided to assist in positioning the work in proper relation to the mold and in means for controlling the amount of pressure applied in the molding operation. It will be evident that in these and other novel and useful aspects the invention is not necessarily limited to the use of a flexible mold.

The above and other features of the invention, including various novel details of construction and combinations of parts, will now be more particularly described by reference to the accompanying drawings and pointed out in the claims.

The machine includes a base casting 10 and an intermediate frame casting 12 on the upper end of which is secured a head casting 14, the latter having in its front end portion a curved recess 16 (Fig. 4) and also having a flat lower face. Pivotally mounted on studs 18 which are secured to the casting 14 are two arms 20 which extend forwardly under the casting and in each of which is slidingly mounted a plunger 22 (Fig. 3) controlled by a spring 24 and by nuts 26, the spring tending to move the plunger forwardly while the nuts adjustably limit such forward movement. At their front ends the plungers 22 extend underneath and support a pair of plates 28 which are pivotally connected together by a stud 30 (Fig. 4), these plates being pivotally connected at 32 to the front end portions of the plungers. The plates 28 are thus mounted in substantially contiguous relation to the flat lower face of the casting 14. They are similar in shape to the toe-embracing wipers of a bed-lasting machine, having front edges that are curved in general similarity to the edge of the toe end portion of a sole, and in the present machine are provided to assist in supporting and guiding the flexible mold hereinafter described for molding the margin of the toe end of the sole.

The flexible mold consists of a plurality of metal blocks 34 connected together in a series by intermediate links 36, so that the blocks and their connecting links constitute, in effect, a series of links of a chain-like structure. Each block has a substantially vertical face 38, adapted to contact with the edge of a sole, and an inclined face 40 (Fig. 6) for molding engagement with the margin of the sole on its outer face, i. e., that face which is on the opposite side from the bottom of the last. The flexible mold is mounted in substantially contiguous relation to the lower face of the pair of plates 28, the two end blocks 34 of the series being pivotally connected to ears 42 on the front ends of the plungers 22. The intermediate block 34 of the series is so formed as to provide an extension 44 which is mounted for lengthwise sliding movement in a guideway in the upper end of the frame casting 12, this block also having a forwardly projecting finger 46 to assist by engagement with the intermediate hinged portions of the plates 28 in supporting it against upward pressure in the molding operation. By reference to Fig. 3 it will be seen that the blocks 34 which act on the sole at the corners of the toe are of smaller extent lengthwise of the edge of the sole than those which act at the sides of the sole farther from the extreme toe end. This facilitates conformity of the mold to the sharply curved portions of the edge of the sole.

Projecting from the rear end of the arms 20 are rods 48 to which are connected the opposite ends of a spring 50, the rods having several recesses 52 therein at different distances from the fulcrum studs 18 to receive the ends of the spring and thus permit the effective force of the spring on the arms to be varied. It will thus be seen that the spring 50 tends to swing the arms 20 in such directions as to separate the front ends of the plungers 22 to which the ends of the flexible mold are connected, so that the tendency is to straighten the mold with an accompanying forward pull on the extension 44 of the intermediate mold block 34. To limit adjustably this forward movement of the extension 44, there is threaded in the rear end of the latter a spindle 54 which extends through an opening in a lug 56 on the casting 14 and has on its end a head 58 adapted to engage the lug when there is no work in the machine. By reason of the pull of the arms 20 and the plungers 22 on the ends of the flexible mold under the influence of the spring 50, and because of the limit imposed on the forward movement of the intermediate mold block 34 and its extension 44 under the pull thus applied, the mold assumes, when there is no work in the machine, substantially a V shape; and by adjustment of the spindle 54 the angle between the two opposite side portions of the mold may be varied for better accommodation initially to wide and narrow toes. A nut 60 serves to lock the spindle in adjusted position.

Figures 1, 5, 6:
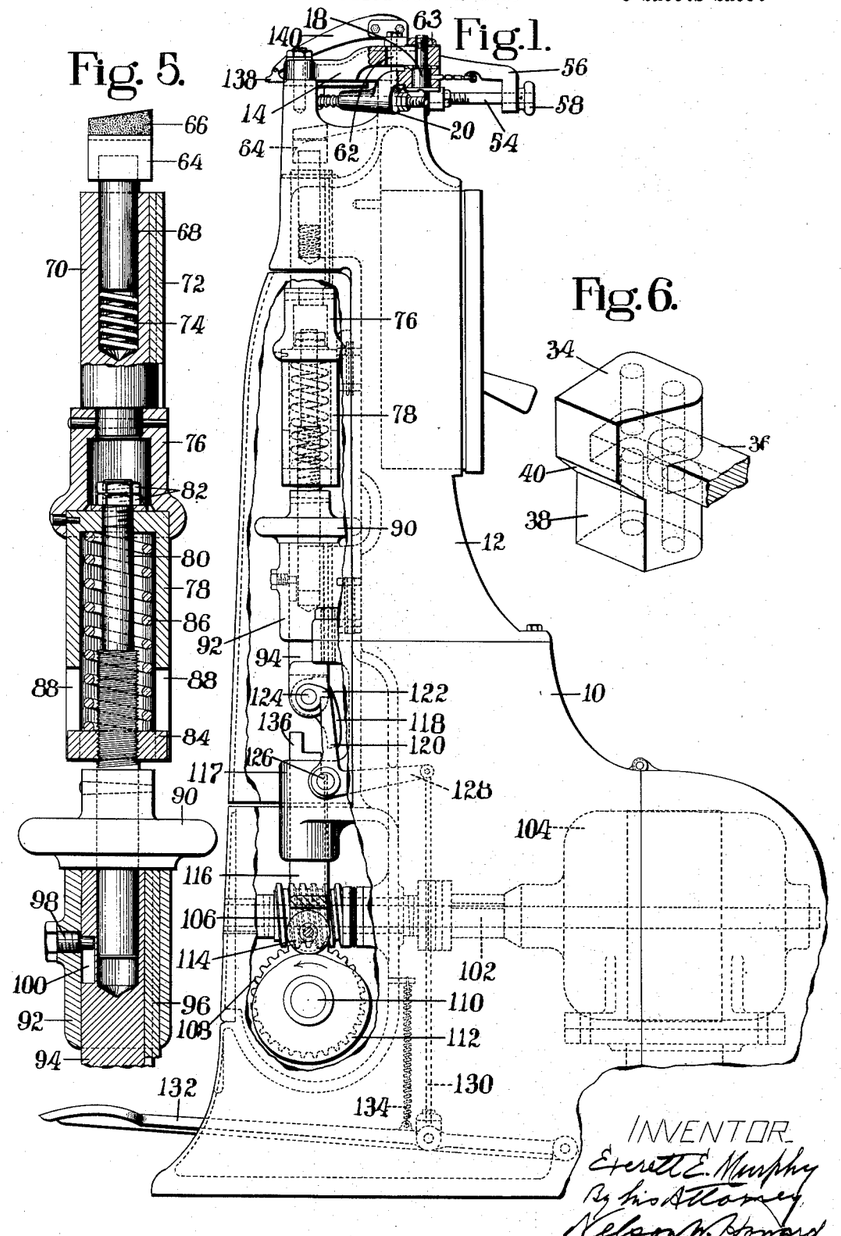
Fig. 1 is a view in side elevation of a machine in which the invention is embodied, with parts broken away.
Fig. 5 is a vertical section showing a portion of the means for removing the last and sole relatively to the mold.
Fig. 6 is a perspective view of a portion of the flexible mold.
Figure 2:
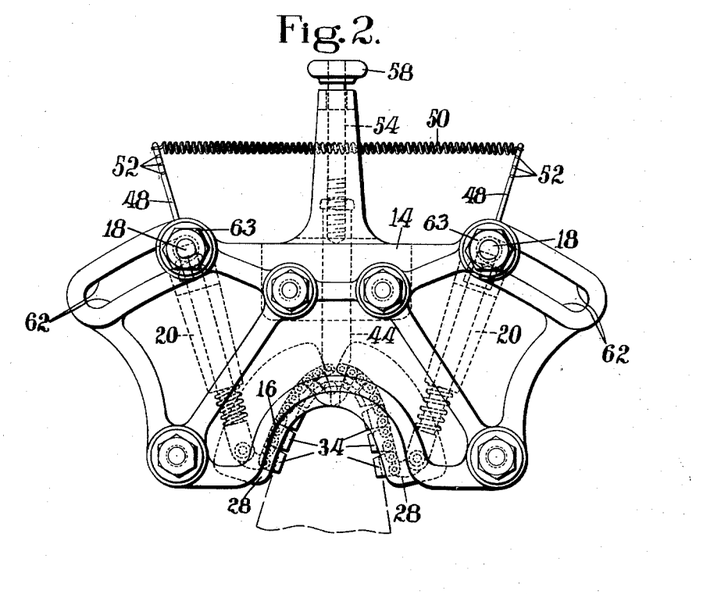
Fig. 2 is a plan view of the head of the machine, with certain parts removed, illustrating diagrammatically the position of a sole at the time of the molding operation.
Figure 3:
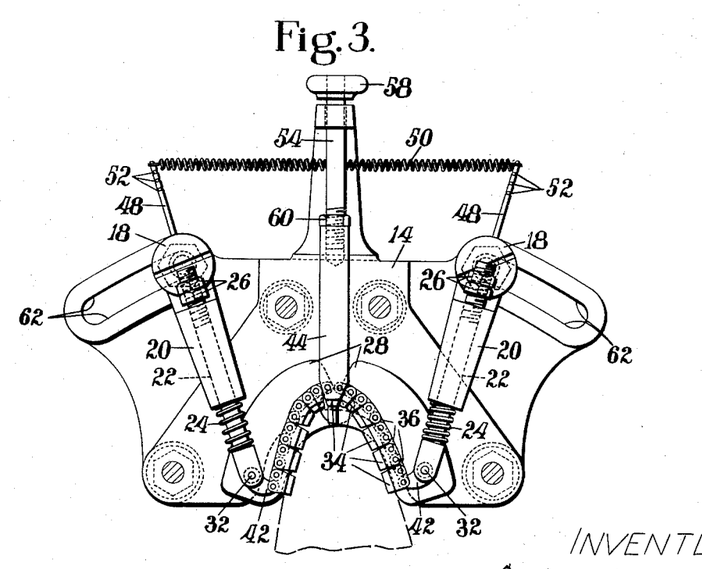
Fig. 3 is an inverted plan view of the parts shown in Fig. 2.
Figure 4:
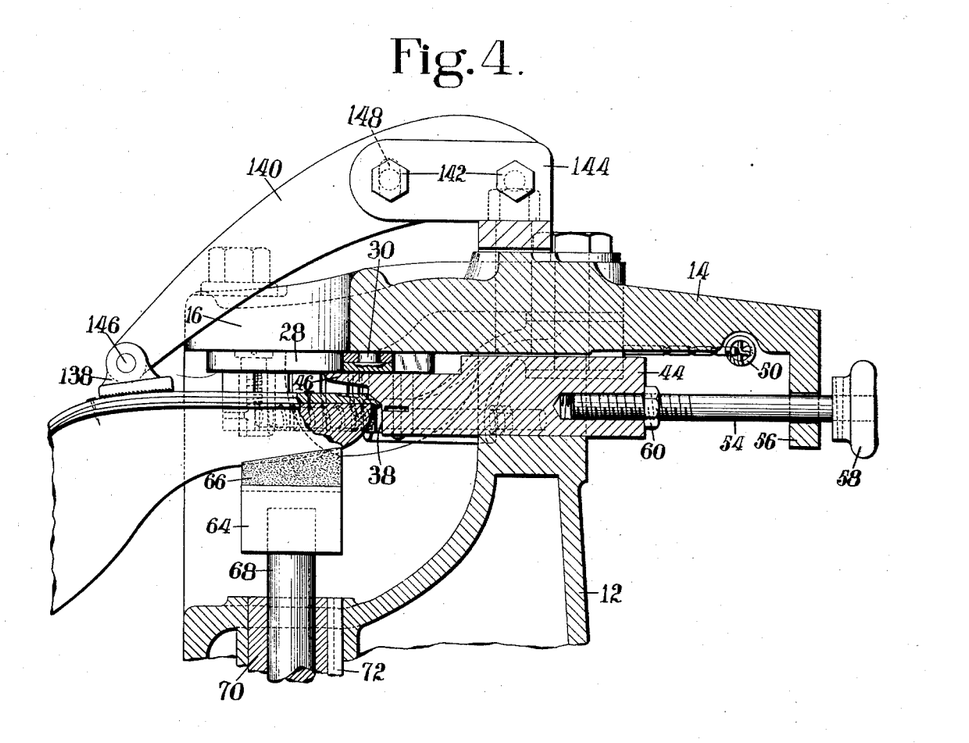
Fig. 4 is a view of the upper portion of the machine partly in side elevation and partly in vertical section, illustrating the positions of the parts at the end of the molding operation.

From the foregoing description it will be understood that when the edge of the toe end of a sole is pressed inwardly against the blocks 34 of the flexible mold, the blocks adjust themselves to the contour of the edge of the sole in response to that pressure. The intermediate block 34 is fixed against lateral movement by its extension 44, so that it can move only in the direction of the length of the sole, this block accordingly acting as an anchor to centralize the mold. The other blocks can move in various directions as required to conform to the edge contours of soles of different sizes or shapes. As the sole is pressed inwardly against the intermediate portion of the mold, a pull is exerted by the opposite ends of the mold on the plungers 22, so that these plungers and their supporting arms 20 are swung inwardly against the resistance of the spring 50 to carry the blocks 34 at and near the ends of the mold into engagement with the edge of the sole if they are not already in engagement with it. Preferably the sole will be pressed inwardly with force enough to move the plungers 22 to some extent lengthwise in the arms 20 against the resistance of the springs 24, as illustrated in Figs. 2 and 3, so as to insure that the end blocks 34 will be held firmly against the edge of the sole in the molding operation. It may be desirable, in order to facilitate the conformity of the mold to soles of widely varying shapes, to change the angular relation of the plungers 22 to the side edges of the sole, and accordingly provision is made for adjustment of the fulcrum studs 18 along slots 62 in the casting 14, the studs being secured in any adjusted positions by nuts 63 in the manner illustrated in Fig. 1. It will be understood that as the flexible mold conforms itself to the contour of the edge of the sole in the manner described, the plates 28 are moved by their connections 32 with the ends of the plungers 22 in various ways depending upon the size and shape of the sole, the plates being so mounted as to permit them to be moved thus bodily lengthwise and laterally of the sole as well as to swing toward or from each other. In any position assumed by the mold the plates 28 are accordingly in position to support it against the upward pressure of the sole against it in the molding operation.

As already stated, the machine herein shown is specially constructed to operate on soles that are mounted on lasts and is provided with means for moving the last and sole relatively to the mold to perform the molding operation. For controlling and moving the last there is provided a toe rest 64 having thereon a rubber pad 66 arranged to engage the top face of the toe end portion of the last. The toe rest is supported on a rod 68 which is slidingly mounted in a bearing in a plunger 70 vertically movable in a bearing in the frame casting 12, the plunger being prevented from turning by a key 72. The lower end of the rod 68 rests upon a spring 74 in the plunger 70 the purpose and function of which are hereinafter explained. Pinned to the lower end of the plunger 70 is a hollow coupling member 76 and to the lower end of this member is secured a hollow cylindrical member 78. A rod 80 extends upwardly through openings in the upper end of the member 78 and the lower end of the member 76, with nuts 82 on its upper end for limiting engagement with the member 76, and between the upper end of the member 78 and a nut 84 on the rod 80 is a compression spring 86. The nut 84 is provided with ears projecting into slots 88 in the member 78 to prevent the nut from turning, so that the amount of compression of the spring 86 may be varied by turning the rod, the latter having fast thereon for this purpose a hand wheel 90. The hub of the hand wheel 90 rests initially on a projection 92 of the frame casting 12 which thus supports the hand wheel and the parts above it and limits the downward movement of these parts. Vertically movable in a bearing in the projection 92 is a plunger 94 which has a recess for the lower end of the rod 80 and is prevented from turning by a key 96. The limit of the downward movement of the plunger 94 is determined by the end of a screw 98 which is mounted in the projection 92 and extends into a slot 100 in the plunger. Upward movement is imparted to the plunger 94 by means hereinafter described. When the plunger 94 is thus moved upwardly it acts on the hand wheel 90 to raise the rod 80, and this rod acts through the spring 86 to impart upward movement to the plunger 70 and thus to raise the toe rest 64. The spring 74 is a comparatively light spring and is readily yieldable in response to downward pressure of the last on the toe rest when the operator presents the work to the machine, the purpose of this spring being to support the work yieldingly with the margin of the sole pressed lightly up against the inclined faces 40 of the mold blocks 34, whatever may be the size or shape of the last, and thus to assist the operator in presenting and maintaining lasts and soles of different sizes or shapes in proper relation to the mold prior to the molding operation. When the parts are moved upwardly to raise the toe end of the last and thus to mold the margin of the sole, the spring 74 is compressed to its limit, and thereafter the heavier spring 86 also is compressed to some extent, the amount of force applied through this spring depending upon the adjustment of the nut 84 on the rod 80. It will be evident that in this adjustment the compression of the spring 86 is varied without varying the height of the toe rest.

For imparting upward movement to the plunger 94 to raise the toe rest 64 the machine herein shown is provided with power-operated mechanism comprising a shaft 102 driven by an electric motor 104, the shaft having thereon a worm 106 in operative engagement with a worm gear 108 fast on a shaft 110. On the shaft 110 is mounted a cam 112 in engagement with a roll 114 which is mounted on the lower end of a plunger 116 slidingly movable in a bearing formed in a projection 117 on the base 10. It will be understood that the shaft 110 is operative continuously, so that the plunger 116 is repeatedly raised and lowered under control of the cam 112. To render the plunger 116 effective to raise the plunger 94 and thus to operate the toe rest, there is supported on the lower end of the plunger 94 a detent 118 which is movable from an idle position in which its lower end is out of alinement with the plunger 116, as shown in Fig. 1, to a position in which its lower end is over the plunger. For controlling the detent 118 there is provided a finger 120 arranged to engage a dog 122 which is fast on a shaft 124 on which the detent also is mounted. The finger 120 is a part of a bell-crank pivotally mounted at 126 on the projection 117 of the base 10, the other arm of this bell-crank being connected by a link 130 to a treadle 132 which is pivoted on the base 10 and is normally raised by a spring 134. As the parts are positioned in Fig. 1, the finger 120 holds the detent 118 in its idle position, so that although the plunger 94 is in its lowermost position it is not affected by the reciprocatory movements of the plunger 116. When it is desired to raise the toe rest 64 for molding the margin of the sole, the operator depresses the treadle 132, thereby moving the finger 120 out of engagement with the dog 122. The detent 118 is then swung by gravity until its lower end is over the upper end of the plunger 116 when the latter is in its lowest position, the detent being prevented from swinging too far by a projection 136 on the upper end of the plunger. In the next upward movement of the plunger 116 a corresponding upward movement is accordingly imparted to the plunger 94. The operator releases the treadle in time for the finger 120 to be returned to a position in vertical alinement with the dog 122 before the plunger 94 moves downwardly again, so that in response to such downward movement the detent 118 is returned to its idle position by the action of the finger on the dog. The limit of the upward movement of the treadle 132 and the corresponding operative position of the finger 120 are determined by a stop (not shown) on the base 10 with which the treadle engages.

It is desirable that in the molding operation no portion of the margin of the sole around the toe shall be bent downward more than another, and this requires that at the end of the molding operation the work shall be in a position in which the plane of the edge of the toe portion of the last bottom is substantially parallel to what may be termed the plane of the mold, namely, the plane determined by the upper extremities of the vertical faces 38 of the series of molding members 34. To assist in controlling the work in such manner that it will be substantially in this position, the machine is further provided with a sole-rest foot 138 arranged to engage the sole at the rear of the toe end and mounted on an arm 140 which is secured by clamping screws 142 to a bracket 144 fast on the head casting 14. The foot 138 is pivoted at 146 on the arm 140 to permit it to adjust itself in parallel relation to the lengthwise contour of the outer face of the sole, and the arm 140 may be adjusted preliminarily about the axis of the rearmost screw 142, the arm having therein a slot 148 to permit this adjustment. The foot 138 extends for a considerable distance widthwise of the sole, so that it determines the position of the last and sole in respect to lateral tipping movement. The operator may position the sole in engagement with the foot 138 in presenting the work to the machine, tipping the last lengthwise enough to position the edge of the toe end portion of the sole below the inclined molding faces 40, after which, in the operation of the machine, the toe end of the last will be forced up by the toe rest until at the end of the molding operation the edge of the toe-end portion of the last bottom is in the required plane. It will be understood that the resistance of the molding faces 40 prevents the toe end of the last from being forced upwardly too far, the spring 86 yielding in the manner hereinbefore described.

The manner of operation of the machine will be readily understood from the foregoing description. Before the sole is mounted on the last its margin at the opposite sides of the forepart will be bent or molded in the manner required by the use of a machine of the progressive type having rolls which feed the sole along lengthwise of its edge in the course of the molding operation. Preferably, moreover, if the shape of the sole permits, this operation will be extended also around the toe, in order to avoid the necessity of presenting the sole twice to the molding machine, although a machine of the progressive type usually does not produce entirely satisfactory results at the end of the toe, as hereinbefore explained. Thereafter the sole is tacked on the bottom of the last with its margin projecting beyond the edge of the forepart of the last bottom, as usual in turn shoe work, and the last with the sole thereon is then presented to the machine herein described for the purpose of reshaping or finally molding the margin of the toe-end portion of the sole. In presenting the work to the machine the operator places the toe end of the last on the toe-rest pad 66 and presses the toe rest downwardly against the resistance of the light spring 74 until it is low enough to permit the edge of the sole to be positioned in engagement with the vertical faces 38 of the molding members 34. At the same time the operator may, if he so desires, rest the bottom face of the sole at the rear of the toe end against the sole-rest foot 138. By pushing the last forwardly with the edge face of the sole in engagement with the molding members 34, which extend across the plane of the sole, these members are made to adjust themselves to the contour of the edge of the sole, whatever may be the size or shape of the sole. After the work has thus been properly positioned with the molding members in engagement with the edge of the sole all around the toe, the operator depresses the treadle 132, whereupon the power-operated means described imparts to the toe rest 64 an upward movement such as to cause the faces 40 of the molding members to bear on the margin of the sole with sufficient pressure to shape or mold it in the manner required, the spring 86 yielding to prevent undue pressure. In this operation the molding members are held against yield heightwise of the last by the overlying plates 28. Thereafter the parts are returned to starting positions and the operator removes the work from the machine.

Having described the invention, what I claim as new and desire to secure by Letters Patent of the United States is:

1. In a machine of the class described, a mold for applying shaping pressure to the margins of soles of different sizes or shapes, said mold being adjustable to conform to the edge contour of each sole irrespective of its size or shape in response to pressure of the edge face of the sole against it prior to the sole-shaping operation.

2. In a machine of the class described, a mold for applying shaping pressure to the margins of soles of different sizes or shapes, said mold comprising a plurality of members arranged to engage the edge face of each sole and relatively movable to conform to the edge contour of each sole irrespective of its size or shape.

3. In a machine of the class described, a device for bending the margins of turn shoe soles prior to the lasting operation, said device being substantially unyielding perpendicularly to the plane of the sole and so constructed as to conform to the edge contour of each sole irrespective of its size or shape prior to the bending of the margin.

4. In a machine of the class described, a device for applying shaping pressure to the margins of soles, said device comprising a chain-like structure conformable to different sole edge contours upon presentation of the edge faces of the soles against it.

5. In a machine for applying shaping pressure to the margins of soles, a flexible mold conformable to the edge contours of soles of different sizes or shapes by contact with the soles prior to the molding operation, and means for effecting relative movement of each sole and the mold in a direction transverse to the plane of the sole to shape the margin of the sole.

6. In a machine for applying shaping pressure to the margins of soles, a mold having different faces for engaging respectively the edge of each sole and the margin of the sole adjacent to its edge, said mold being flexible to adapt it to conform to the edge contour of each sole irrespective of its size or shape prior to the molding operation.

7. In a machine for bending the margins of soles, a plurality of bending members each having a face for engaging the edge of a sole and another face for engaging the margin of the sole adjacent to its edge, said members being arranged in a series and relatively movable to conform to the edge contours of different soles irrespective of their sizes or shapes.

8. In a machine of the class described, a mold for applying shaping pressure to the margins of soles of different sizes or shapes, said mold being substantially unyielding perpendicularly to the plane of the sole and conformable to the edge contour of each size or shape of sole in response to pressure of the edge face of the sole against it.

9. In a machine for applying shaping pressure to the margins of soles, a flexible mold conformable to the edge contour of each sole presented to the machine in response to pressure of the edge face of the sole against it prior to the molding operation.

10. In a machine of the class described, a device constructed and arranged to bend the margins of turn shoe soles of different sizes or shapes over the edges of the lasts toward the upper-shaping surfaces of the lasts after the soles have been mounted on lasts and prior to the lasting operation, said device comprising bending means substantially unyielding heightwise of the last and variable in shape in response to pressure of the work against it to accommodate it to differences in the edge contours of different soles.

11. In a machine of the class described, a device for bending the margins of soles of different sizes or shapes, said device being variable in shape to conform to the edge contour of each size or shape of sole in response to pressure applied thereto by the edge face of the sole in the presentation of each differently shaped sole for treatment.

12. In a machine of the class described, a mold for applying shaping pressure to the margins of the toe end portions of soles of different sizes or shapes, said mold comprising a plurality of molding members for engaging the sole at each side of the toe and the members at each side being relatively movable upon engagement with the edge face of each sole to accommodate the mold to the edge contour of each different size or shape of sole.

13. In a machine of the class described, a device for applying shaping pressure to the margins of the toe end portions of soles of different sizes or shapes, said device comprising a chain-like structure arranged to extend around the toe end of a sole from one side of the toe to the other side in engagement with the edge face of the sole and conformable to the edge contour of each sole irrespective of its size or shape.

14. In a machine of the class described, a mold for applying shaping pressure to the margins of the toe end portions of soles of different sizes or shapes, said mold comprising a plurality of molding members arranged to act on the sole respectively at the end, corners and sides of the toe and relatively movable to positions determined by engagement with the edge face of each sole to accommodate the mold to different sole edge contours, the members at the corners of the toe being of smaller extent lengthwise of the edge of the sole than the members at the sides of the toe.

15. In a machine for applying shaping pressure to the margins of soles, a flexible mold constructed and arranged to wrap itself around the edge face of an end of each sole in conformity to the edge contour of the sole in response to pressure of the sole against it as the sole is presented for treatment.

16. In a machine of the class described, a mold for applying shaping pressure to the margins of the toe end portions of soles, said mold comprising a plurality of molding members arranged to act on a sole around the end and along the sides of the toe and relatively movable to conform to the edge contour of the sole in response to pressure of the sole against it.

17. In a machine of the class described, a device for bending the margins of the toe end portions of turn shoe soles prior to the lasting operation, said device being constructed and arranged to adjust itself to the edge contour of the toe end portion of each sole in response to pressure of the edge of the sole against it.

18. In a machine of the class described, a device for bending the margins of the toe end portions of turn shoe soles after the soles have been mounted on lasts and prior to the lasting operation, said device being constructed to extend around the toe end of each sole from one side of the toe to the other side in engagement with the margin of the sole on the opposite side from the last and being variable in shape in response to pressure of the work against it to accommodate it to differences in the edge contours of soles of different sizes or shapes.

19. In a machine of the class described, a device for bending the margins of the toe end portions of soles of different sizes or shapes, said device being constructed to extend around the toe end of each sole from one side of the toe to the other side and being variable in shape in response to pressure applied thereto by the edge face of the sole prior to the bending operation in the presentation of each differently shaped sole for treatment.

20. In a machine of the class described, a flexible mold for applying shaping pressure to the margins of soles, said mold being constructed and arranged to extend around an end of each sole from one side of the sole to the other side and being conformable to the edge contour of the sole in response to pressure of the edge face of the sole against it prior to the sole-shaping operation, and yieldable means against the resistance of which the mold is thus conformable to the edge of the sole.

21. In a machine of the class described, a flexible chain-like mold arranged to extend around the toe ends of soles of different sizes or shapes in conformity to the edge contour of each sole for shaping the margins of the soles and also to extend across the plane of each sole, and means for yieldingly controlling the opposite ends of said mold.

22. In a machine of the class described, a flexible mold for applying shaping pressure to the margins of the toe end portions of soles, said mold being constructed and arranged to extend around the toe end of each sole from one side of the toe to the other side and being conformable to the edge contour of the sole in response to pressure of the edge of the sole against it, and controlling means connected to the opposite end portions of the mold and yieldingly movable in directions toward the opposite side edges of the sole in response to pressure of the edge of the sole against the intermediate portion of the mold.

23. In a machine of the class described, a flexible mold for applying shaping pressure to the margins of the toe end portions of soles, said mold being constructed and arranged to extend around the toe end of each sole from one side of the toe to the other side and being conformable to the edge contour of the sole in response to pressure of the edge of the sole against it, and spring-controlled members connected to the opposite ends of the mold and tending to separate said ends while permitting them to approach the opposite side edges of the sole in response to pressure of the edge of the sole against the intermediate portion of the mold.

24. In a machine of the class described, a flexible mold for applying shaping pressure to the margins of the toe end portions of soles, said mold being constructed and arranged to extend around the toe end of each sole from one side of the toe to the other side and being conformable to the edge contour of the sole in response to pressure of the edge of the sole against it, and spring-controlled members connected to the opposite ends of the mold and mounted for swinging movements widthwise of the sole to permit them to approach the side edges of the sole as pressure is applied to the intermediate portion of the mold, said members being adjustable to vary their angular relation to the side edges of the sole.

25. In a machine of the class described, a device for bending the margins of the toe end portions of turn shoe soles after the soles have been mounted on lasts and prior to the lasting operation, said device being constructed to extend around the toe end of each sole from one side of the toe to the other side in engagement with the margin of the sole on the opposite side from the last and being flexible to accommodate it to different sole edge contours, and controlling means tending to separate the ends of said device but yieldable to permit said ends to approach each other in response to pressure of the work against the intermediate portion of the device.

26. In a machine of the class described, a flexible device for applying shaping pressure to the margins of the toe end portions of soles, said device being constructed and arranged to extend around the toe end of each sole and being conformable to the edge contour of the sole in response to pressure of the edge of the sole against its intermediate portion, and spring means arranged to press the opposite end portions of said device against the side edges of the sole under stress resulting from the pressure of the sole against the intermediate portion of the device.

27. In a machine of the class described, a flexible device for applying shaping pressure to the margins of the toe end portions of soles, said device being constructed and arranged to extend around the toe end of each sole and being conformable to the edge contour of the sole in response to pressure of the edge of the sole against its intermediate portion, and spring-controlled plungers connected to the opposite end portions of said device and arranged to act in directions transverse to the opposite side edges of the sole to press the device against said edges, said plungers being yieldable in response to pressure of the sole against the intermediate portion of the device when the sole is presented in position for the shaping operation.

28. In a machine of the class described, a flexible device for applying shaping pressure to the margins of the toe end portions of soles, said device being constructed and arranged to extend around the toe end of each sole and being conformable to the edge contour of the sole in response to pressure of the edge of the sole against its intermediate portions, spring-controlled arms arranged to control the opposite end portions of said device and mounted for swinging movements toward the side edges of the sole in response to the pressure of the sole against the device, and spring-controlled plungers in said arms yieldable in response to said pressure and operative thereafter to hold the end portions of the device against the side edges of the sole.

29. In a machine of the class described, a flexible device for applying shaping pressure to the margins of soles, said device being constructed to extend around an end of each sole from one side of the sole to the other side and across the plane of the sole prior to the shaping of the margin, and spring means tending to move the opposite ends of said device apart while permitting them to approach each other in response to pressure applied to the device between its ends.

30. In a machine of the class described, a flexible device for applying shaping pressure to the margins of souls, said device being constructed to extend around an end of each sole from one side of the sole to the other side and across the plane of the sole prior to the shaping of the margin, and spring-controlled members connected to the opposite ends of said device and movable toward each other in response to pressure applied to the device between its ends.

31. In a machine of the class described, a flexible mold constructed and arranged to extend around an end of a sole from one side of the sole to the other side for shaping the margin of the sole and conformable to different sole edge contours, spring means tending to move the opposite end portions of said mold apart and thereby to straighten it, and means connected to the intermediate portion of the mold for limiting the separating movement of its ends.

32. In a machine of the class described, a flexible mold constructed and arranged to extend around an end of a sole from one side of the sole to the other side for shaping the margin of the sole and conformable to different sole edge contours, spring means tending to move the opposite end portions of said mold apart and thereby to straighten it, and means connected to the intermediate portion of the mold for limiting the separating movement of its ends, said limiting means being adjustable to vary the initial contour of the mold.

33. In a machine of the class described, a mold for applying shaping pressure to the margins of soles, said mold being constructed to extend around an end of each sole from one side of the sole to the other side and being flexible to adapt it to conform to different sole edge contours, spring means for yieldingly controlling the opposite end portions of the mold while permitting them to adjust themselves to the side edges of the sole in response to pressure of the edge of the sole against the intermediate portion of the mold, and means for holding the intermediate portion of the mold against any substantial movement widthwise of the sole while permitting it to move lengthwise of the sole in response to said pressure.

34. In a machine of the class described, a mold for applying shaping pressure to the margins of soles, said mold comprising a plurality of interconnected molding members arranged to extend in a series around an end of each sole and relatively movable to conform to different sole edge contours, spring means for yieldingly controlling the opposite end portions of the mold while permitting them to adjust themselves to the side edges of the sole in response to pressure of the sole against the intermediate portion of the mold, and means for guiding one of said molding members at the intermediate portion of the mold for movement lengthwise of the sole while preventing any substantial movement thereof widthwise of the sole.

35. In a machine for shaping the margins of soles, a chain-like series of interconnected sole-shaping members arranged to extend around an end of each sole and conformable to different sole edge contours, one of said members substantially midway between the opposite ends of the series being extended to serve as a slide, means for guiding said slide for movement lengthwise of the sole, and means for yieldingly controlling the opposite ends of the series of members while permitting them to adjust themselves to the side edges of each sole.

36. In a machine for shaping the margins of soles, a chain-like series of interconnected sole-shaping members arranged to extend around an end of each sole and conformable to different sole edge contours, one of said members substantially midway between the opposite ends of the series being extended to serve as a slide, means for guiding said slide for movement lengthwise of a sole, spring means connected to the opposite ends of said series of members and tending to move said ends apart and thereby to pull said slide forwardly, and means for adjustably limiting the forward movement of the slide.

37. In a machine for molding the margins of soles, a flexible mold arranged to extend around an end of each sole and conformable to different sole edge contours, and a pair of plates relatively movable about a common axis and arranged to support said mold against the molding pressure, said plates being thus movable to different positions corresponding to differences in the contour of the mold required by differently shaped soles.

38. In a machine for holding the margins of soles, a flexible mold arranged to extend around an end of each sole and conformable to different sole edge contours, means for yieldingly controlling the opposite ends of said mold while permitting them to assume various positions in response to the pressure of the edges of differently shaped soles against the mold, and a pair of hinged plates arranged to support the mold against the molding pressure, said plates being connected to the ends of the mold to assume various positions under control of said mold ends.

39. In a machine for molding the margins of soles, a flexible mold arranged to extend around an end of each sole and conformable to different sole edge contours, means for yieldingly controlling the opposite ends of said mold while permitting them to assume various positions in response to the pressure of the edges of differently shaped soles against the mold, and a pair of hinged plates arranged to support the mold against the molding pressure, said plates being connected to the ends of the mold and movable relatively to each other and also bodily both lengthwise and laterally of the sole under control of said mold ends as the mold adjusts itself to the contours of soles of different shapes.

40. In a machine of the class described, a device for bending the margin of a turn shoe sole on a last over the edge of the last bottom prior to the lasting operation, said device comprising bending means substantially unyielding heightwise of the last, and means for moving the last and sole relatively to the bending device to cause said device to bend the margin of the sole.

41. In a machine of the class described, a device for bending the margin of the toe end of a turn shoe sole on a last over the edge of the last bottom prior to the lasting operation, means for maintaining said device substantially stationary in the bending operation, and means for moving the last and sole relatively to said device to bend the margin of the sole.

42. In a machine of the class described, a device for bending the margin of the toe end portion of a turn shoe sole on a last over the edge of the last bottom prior to the lasting operation, said device being substantially unyielding heightwise of the last in the bending operation, and a support for the last, said support being movable to cause said device to bend the margin of the sole.

43. In a machine of the class described, a device for bending the margin of the toe end portion of a turn shoe sole on a last over the edge of the last bottom prior to the lasting operation, a toe rest for engaging the last, and means for operating said toe rest to move the last and sole relatively to the bending device to bend the margin of the sole.

44. In a machine of the class described, a mold formed to extend around an end of a sole on a last in localized engagement with the margin of the sole for shaping said margin, means for holding the mold against movement in a direction heightwise of the last in the shaping operation, and means for moving the last and sole relatively to said mold to cause the mold to shape the margin of the sole.

45. In a machine of the class described, a mold formed to extend around the toe end of a sole on a last in localized engagement with the margin of the sole for shaping said margin, a toe rest for controlling the last, and means for operating said toe rest to move the last and sole relatively to the mold including a spring arranged to yield when the margin of the sole has been subjected to a predetermined pressure.

46. In a machine of the class described, a mold formed to extend around the toe end of a sole on a last in localized engagement with the margin of the sole for shaping said margin, a toe rest for controlling the last, means for operating said toe rest to move the last and sole relatively to the mold including a spring arranged to yield when the margin of the sole has been subjected to a predetermined pressure, and a device constructed and arranged to adjust the stress of said spring without altering the position of the toe rest.

47. In a machine of the class described, a device for shaping the toe end of a sole on a last, and a toe rest for supporting the toe end of the last, said toe rest being yieldable in response to pressure of the last against it to facilitate the presentation of the work in operative relation to said device.

48. In a machine of the class described, a mold formed to extend around the toe end of a sole on a last in localized engagement with the margin of the sole for shaping said margin, and a toe rest for supporting the toe end of the last, said toe rest being yieldable in response to pressure of the last against it to facilitate the presentation of the work in operative relation to the mold.

49. In a machine of the class described, a mold formed to extend around the toe end of a sole on a last in localized engagement with the margin of the sole for shaping said margin, a toe rest for supporting the toe end of the last, a light spring arranged to support said toe rest and to yield in response to pressure of the last on the toe rest to facilitate the presentation of the work in operative relation to the mold, and means for operating the toe rest to move the last and sole relatively to the mold including a stronger spring arranged to yield when the margin of the sole has been subjected to a predetermined pressure.

50. In a machine of the class described, means for shaping the margins of the toe end portions of soles of different sizes or shapes after the soles have been mounted on lasts, and a toe rest for supporting the toe end of each last, said toe rest being depressible in response to pressure of the last against it to facilitate the presentation of the different lasts and soles in operative relation to the shaping means.

51. In a machine of the class described, a device for bending the margins of the toe end portions of turn shoe soles of different sizes or shapes after the soles have been mounted on lasts, said device being conformable to the edge contours of the different soles in response to pressure of the soles against it, and a toe rest for supporting the toe end of each last, said toe rest being depressible in response to pressure of the last against it to facilitate the presentation of the different lasts and soles in operative relation to the bending device.

52. In a machine of the class described, a mold for shaping the margins of the toe end portions of soles of different sizes or shapes after the soles have been mounted on lasts, said mold having a portion arranged to engage the edge of the sole and another portion arranged to engage the margin of the sole adjacent to said edge, a toe rest for supporting the toe end of each last, and a spring for supporting said toe rest, said spring being arranged to yield in response to pressure of the last on the toe rest to facilitate the presentation of the different lasts and soles in operative relation to the mold and thereafter to act on the last to press the sole against the margin-engaging portion of the mold.

53. In a machine of the class described, a device formed to extend around the toe end of a sole on a last from one side of the toe to the other side for shaping the margin of the sole, and a sole rest for engaging the sole in a location spaced from the margin of the toe end of the sole to assist in determining the proper plane of presentation of the margin of the toe end of the sole in relation to said shaping device.

54. In a machine of the class described, a device formed to extend around the toe end of a sole on a last from one side of the toe to the other side for shaping the margin of the sole, and a sole rest constructed and arranged to determine the position of the last and sole with respect to lateral tipping movement.

55. In a machine of the class described, a mold for bending the margin of the toe end portion of a turn shoe sole on a last over the edge of the last bottom, a toe rest for supporting the toe end of the last, and a sole rest for engaging the sole at the rear of the toe end to assist in determining its proper relation to the mold.

56. In a machine of the class described, a mold for bending the margin of the toe end portion of a turn shoe sole on a last over the edge of the last bottom, said mold having a shaping portion formed to extend over the margin of the sole, means for moving the toe end of the last relatively to the mold to press the margin of the sole against said shaping portion, and means for engaging the outer face of the sole to assist in determining the proper relation of the sole to the mold at the end of the molding operation.

EVERETT E. MURPHY.